United States Patent Office 2,718,222
Patented Sept. 20, 1955

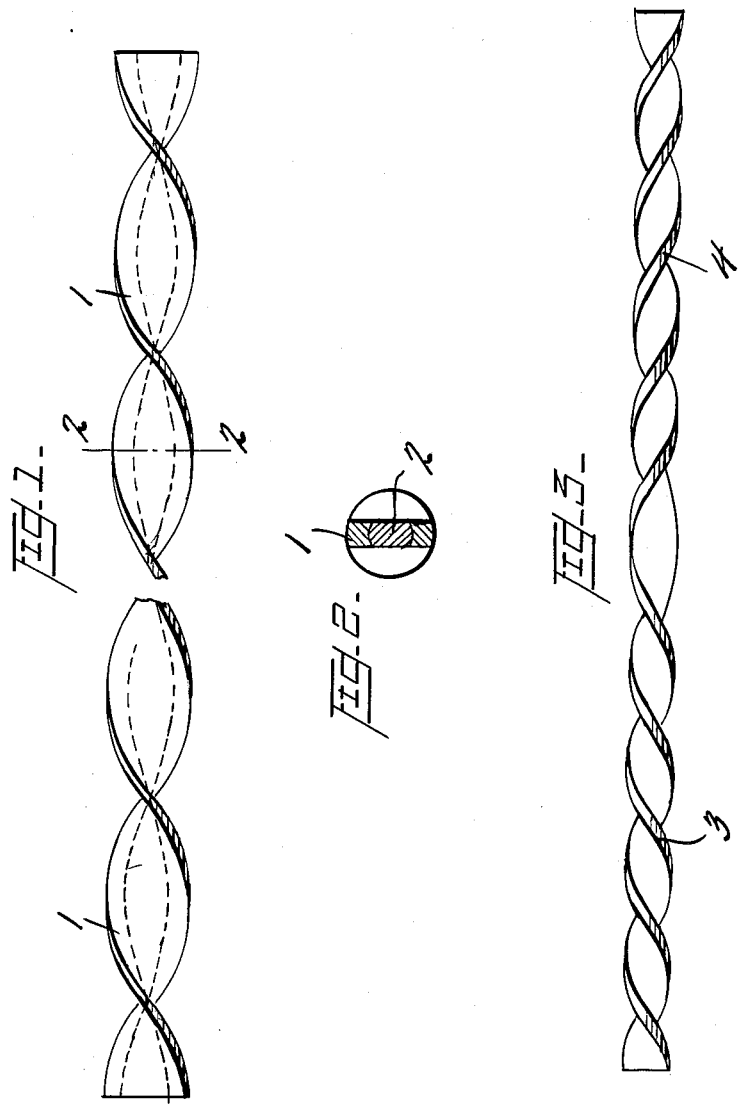

2,718,222

COMPOUND WIRE SAW STRAND

Pierre de Vitry d'Avaucourt, Bainbridge, Pa.

Application April 9, 1952, Serial No. 281,288

10 Claims. (Cl. 125—18)

This invention relates to an improved compound wire saw strand particularly useful in the cutting of granite, marble, and other hard materials of a similar nature.

The wire saw strands now in use, including those made in accordance with my prior invention, incorporating a single strand, and those of multiple strand type, operate essentially as abrasive carriers for a loose abrasive pulp which does the actual grinding. With medium hard steel of 150,000 pounds per square inch tensile strength, which is customarily used in single saw strands, and material of similar hardness used in multiple saw strands, there is practically no embedding of the abrasive material in the saw strand, with the result that large quantities of abrasive must be used with consequent increase in expenses of the sawing operation.

It is well recognized in the grinding industry that bonded abrasives are much more efficient and economical in operation than are the abrasive carrier type of grinding members. By bonded abrasives is meant abrasives which are embedded in or bonded to a matrix so that the abrasive particles are firmly attached, rather than to abrasive materials which are merely carried loosely on the surface of the grinding element. Bonded abrasives not only operate at a higher rate of speed, but also, since no loose abrasive material is required, are much less expensive to operate, while at the same time contributing to a much cleaner and neater operation.

In the art of sawing granite, marble or similar materials, by wire sawing, there are a number of different operations where sawing with conventional wire saw strands cannot be successfully or economically accomplished. One example of this is in sawing in a substantially vertical direction. It has been found that this is almost impossible with conventional wire sawing equipment, due to the fact that the loose abrasive cannot be properly carried by the vertically moving strand during the sawing operation, resulting, therefore, in substantially no cutting action or at best, in very unsatisfactory results.

The principal object of the present invention is to provide a compound saw strand which can be used successfully in all operations encountered in the wire sawing field including sawing in a vertical direction. This is due to the fact that the present invention relates to a strand which can be used in essentially the same manner as bonded abrasive grinding elements thereby insuring that the abrasive is present under all conditions during the sawing operation.

In wire sawing granite, marble and the like, it is essential that the saw strand be of a material which will withstand the tensile forces encountered in wire sawing, and in prior practice, these strands have been formed of a wire that is so hard that the abrasive cannot be embedded in the surface thereof. In the present invention, the compound strand is provided with a surface material in which the abrasive will be embedded, and can serve in the same manner as a bonded abrasive element capable of use under all conditions met with in the quarrying field.

The present invention is illustrated in the attached drawing forming part thereof, and in which Figure 1 is a top plan view of a short section of wire embodying the present invention;

Figure 2 is a sectional view taken on the line 2—2 of Figure 1 to a somewhat reduced scale;

Figure 3 is a plan view of a section of the wire of Figure 1 showing adjacent sections twisted in opposite directions.

Referring more particularly to the drawings, the strand of the present invention comprises a flat strip of metal 1 having embedded centrally therein a core 2 which is here illustrated as being of flattened section.

The flat strip 1 is made of a soft material into which suitable abrasive materials may be embedded, and I have found it preferable to use a material such as red copper or soft aluminum.

In order that the requisite strength may be imparted to the strip 1, a core strand 2 is centrally located therein, and extends along the longitudinal axis of the strip. This core 2 is formed of a medium hard metal, preferably steel, of a tensile strength of approximately 150,000 pounds per square inch in order to withstand the strain incident to the wire sawing operation. It will be readily appreciated that the soft metal strip 1 is not capable of being used alone, due to its low tensile strength, and it is essential, therefore, to incorporate the core of high tensile strength, in order to prevent rupture of the strand during the sawing operation.

In Figure 3, there is illustrated a form of my invention, which consists of the strand as shown in Figures 1 and 2 twisted in such a manner that the section 3 is twisted in one direction, while the adjacent section 4 is twisted in an opposite direction, it being understood that this is conventional in the strands in use today, and it will be further apparent that the strand is twisted along the longitudinal axis thereof in order that uniform cutting may be accomplished.

In the formation of the strand of the present invention, the preferred practice is to take a copper or aluminum encased round steel wire of the type sometimes used for electrical conductors, and pass the same through a mill, effective for deforming the wire to the configuration shown in Figure 2, in which the copper or aluminum coated round wire is flattened into a strip. The strip will then preferably be twisted in such a fashion that one portion will be of right-hand twist and the next adjacent portions of left-hand twist, generally as disclosed in my prior patent covering a single strand saw wire.

In this flattening operation, it will be seen from Figure 2 that the core 2 is likewise flattened and that the copper or aluminum coating material has been displaced laterally so as to form portions on opposite sides of the wire core in which the abrasive material may be embedded, these lateral portions forming the cutting portions of the wire saw strand.

In attempting to twist compound wire strands which consist of a hard core and a soft coating or enclosing material, it is obvious that some provision must be made to prevent the soft material from being torn away or sheared from the core. If a core having a round cross section were substituted for the flattened core 2 of the present invention, it is obvious that any attempts to twist the wire would result in twisting or tearing the softer enclosing metal away from the core thereby rendering the wire saw useless. By flattening the core 2 as herein disclosed, it is obvious that the core may be gripped on its flat faces by the twisting mechanism so that the twisting forces are applied to the hard core and the softer enclosing metal is undisturbed.

As one example, the wire saw of the present invention may be accurately and properly twisted by the apparatus shown and described in my application, Serial No. 789,705, filed December 4, 1947, now Patent No. 2,616,478 but, of course, any of the known manners of twisting may be employed.

In operation of this type of sawing strand, a preferred practice will be to run the strand in the conventional manner with a pulp consisting of water and loose abrasive. The abrasive will become embedded in the soft metal such as copper, aluminum or the like, and will then serve as a bonded abrasive. If desired or necessary, a small quantity of loose abrasive may be fed to the strand as it operates. A portion of such additional abrasive will be embedded in the copper strip. An alternative method would be to start the sawing operation in the conventional manner and then run as a bonded abrasive for a period of time until the abrasive surface wears away, whereupon additional loose abrasive may be applied to the kerf, which, upon further operation will become embedded in the strand to replenish the abrasive material embedded therein.

I have found that abrasive particles such as cerium oxide, Carborundum and the like readily embed themselves in red copper and become firmly anchored therein.

I claim:

1. A flexible wire saw strand comprising a central core strand of high tensile strength metal and a surrounding sheath of softer metal having abrasive material embedded therein.

2. A flexible wire saw strand comprising a flat strip of metal consisting of an inner central core strand of high tensile strength metal and a surrounding sheath of softer metal having abrasive material embedded therein.

3. A flexible wire saw strand comprising a flat strip of soft metal having embedded therein a centrally located strand of metal of high tensile strength.

4. A flexible wire saw strand comprising a flat strip of soft metal having embedded therein a centrally located strand of metal of high tensile strength, said strand being twisted to provide helical convolutions.

5. A flexible wire saw strand comprising a flat strip of soft metal having embedded therein a centrally located strand of metal of high tensile strength, said strand being twisted to provide helical convolutions, the convolutions in one section of the strand being of opposite hand from the convolutions in an adjacent section.

6. A flexible wire saw strand consisting of a flat strip of soft copper having embedded centrally therein a core strand of high tensile strength steel, said strand being twisted to provide helical convolutions.

7. A flexible wire saw strand consisting of a flat strip of soft aluminum having embedded centrally therein a core strand of high tensile strength steel, said strand being twisted to provide helical convolutions.

8. A flexible wire saw strand comprising a flat strip of soft metal, a steel wire of high tensile strength extending along the longitudinal center of said strip and bonded thereto, said strip being twisted to provide helical convolutions and an abrasive material embedded in said soft metal.

9. A flexible wire saw strand comprising a flat strip of soft metal having embedded therein a centrally located flat core of high tensile strength, said strand being twisted to provide helical convolutions.

10. A flexible wire saw strand comprising a flat strip of soft metal having embedded therein a centrally located flat core of high tensile strength, the flat faces of said core being parallel to the side faces of the strip.

References Cited in the file of this patent

UNITED STATES PATENTS

| | | |
|---|---|---|
| 9,147 | Eames | July 27, 1852 |
| 92,551 | Vermilya et al. | July 13, 1869 |
| 334,567 | Clemson | Jan. 19, 1886 |
| 689,615 | Heyl-Dia | Dec. 24, 1901 |
| 1,730,756 | Brown | Oct. 8, 1929 |
| 1,885,132 | Nimick | Nov. 1, 1932 |
| 2,003,994 | D'Avaucourt | July 4, 1935 |